United States Patent [19]
Lord et al.

[11] 3,879,222
[45] Apr. 22, 1975

[54] SEALED PRIMARY SODIUM-HALOGEN CELL

[75] Inventors: Peter C. Lord, Schenectady; Gregory C. Farrington, Clifton Park, both of N.Y.

[73] Assignee: General Electric Company, Schenectady, N.Y.

[22] Filed: Mar. 27, 1974

[21] Appl. No.: 455,149

[52] U.S. Cl. ............................................ 136/83 R
[51] Int. Cl. ......................................... H01m 13/00
[58] Field of Search ............ 136/83 R, 100, 20, 6 R, 136/6 LN, 6 FS, 153

[56] References Cited
UNITED STATES PATENTS

| | | | |
|---|---|---|---|
| 3,578,500 | 5/1971 | Marick et al. | 136/83 R |
| 3,703,415 | 11/1972 | Mitoff et al. | 136/83 R |
| 3,730,771 | 5/1973 | Tannenberger et al. | 136/6 R |
| 3,762,955 | 10/1973 | Dubin | 136/83 R |
| 3,773,558 | 11/1973 | Charbonnier et al. | 136/100 R |
| 3,793,080 | 2/1974 | Hess | 136/83 R |
| 3,817,790 | 6/1974 | Mitoff | 136/83 R |

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A sealed primary sodium-halogen cell is disclosed which comprises a casing, an anode positioned in the casing, the anode selected from the class consisting of sodium, sodium as an amalgam, and sodium in a non-aqueous electrolyte, a solid sodium ion-conductive electrolyte positioned in the casing adjacent the anode, and a cathode positioned adjacent the opposite side of the electrolyte, the cathode comprising iodine monochloride in a solvent of thionyl chloride, phosphoryl chloride or sulfuryl chloride.

3 Claims, 1 Drawing Figure

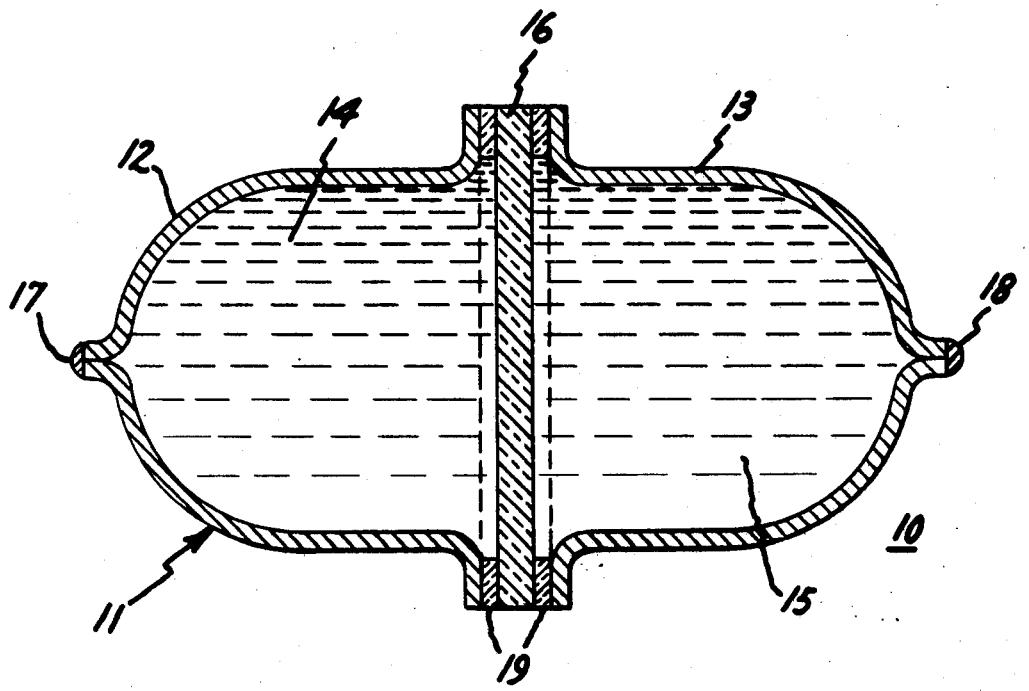

SEALED PRIMARY SODIUM-HALOGEN CELL

This invention relates to sealed primary sodium-halogen cells and, more particularly, to such cells employing a cathode of iodine monochloride in a specific solvent.

Sealed sodium-halogen cells are known in the prior art as, for example, described in U.S. Pat. No. 3,793,080 issued Feb. 19, 1974 under the title "Sealed Primary Sodium-Halogen Battery With Bromine-Iodine Mixture." This patent describes and claims such a battery in which the cathode comprises a mixture of bromine and from 5.0 to 60 weight percent of iodine with specific conductive material, additives or both. The subject patent is assigned to the same assignee as the present application.

In copending application, Ser. No. 455,148 filed Mar. 27, 1974, in the name of Gregory C. Farrington entitled "Sealed Primary Sodium-Halogen Cell," there is described and claimed such a cell wherein the cathode comprises iodine monochloride, or iodine monochloride in a solvent of acetonitrile, butyrolactone or propylene carbonate. This copending application is assigned to the same assignee as the present application.

The primary object of our invention is to provide a primary battery which has a near zero self-discharge rate, high cell voltage and high energy density.

In accordance with one aspect of our invention, a sealed primary sodium-halogen battery comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode comprising iodine monochloride in a solvent selected from the class consisting of thionyl chloride, and phosphoryl chloride, and sulfuryl chloride.

These and various other objects, features and advantages of the invention will be better understood from the following description taken in connection with the accompanying drawing in which:

The single FIGURE is a sectional view of a battery made in accordance with my invention.

In the single FIGURE of the drawing, there is shown generally at 10 a sealed primary sodium-halogen battery embodying our invention which has a metallic casing 11 including an anode portion 12 and a cathode portion 13. An anode 14 of sodium as an amalgam is shown positioned within anode portion 12. A cathode 15 comprising iodine monochloride in a solvent of thionyl chloride is shown positioned within the cathode portion 13. A solid sodium ion-conductive electrolyte 16 is positioned between and adjacent anode 14 and cathode 15. Electrical leads (not shown) are affixed to the respective casing portions. Closed fill tubes 17 and 18 are associated with the respective portions 12 and 13. Electrolyte 16 is secured on opposite sides to portions 12 and 13 by identical glass seals 19.

We found that we could form a sealed primary sodium-bromine cell by providing a metallic casing, providing an anode within the casing, the anode selected from the class consisting of sodium, sodium as an amalgam or sodium in a nonaqueous electrolyte, providing a solid sodium ion-conductive electrolyte adjacent the anode, and providing a cathode adjacent the opposite side of the electrolyte, the cathode comprising iodine monochloride in a solvent selected from the class consisting of thionyl chloride, phosphoryl chloride, and sulfuryl chloride. Such cells have open circuit voltages of from 3.9 to 4.4 volts.

The anode may consist of sodium, a sodium amalgam, or sodium in a nonaqueous electrolyte. The sodium amalgam can be in the range of compositions from about 95 percent sodium and 5 percent mercury by weight to about 35 percent sodium and 65 percent mercury. For the fully charged state of the cell, the amalgam composition is preferably high in sodium. Cells using sodium amalgams cannot be used efficiently at temperatures below 21.5°C due to complete freezing of the amalgam.

The use of organic electrolytes permits cell operation to much lower temperatures as determined by the freezing point of the electrolyte. A preferred electrolyte is propylene carbonate in which a halide salt is dissolved. This electrolyte permits cell operation down to 0°C.

The cathode comprises iodine monochloride in a solvent selected from the class consisting of thionyl chloride, phosphoryl chloride, and sulfuryl chloride.

We discovered that iodine monochloride is completely miscible in thionyl chloride, $SOCl_2$, in phosphoryl chloride, $POCl_3$, and in sulfuryl chloride, $SO_2Cl_2$, and ionizes sufficiently to make the resulting solutions conductive. These solvents, thionyl chloride, phosphoryl chloride, and sulfuryl chloride, are highly oxidized liquids which appear stable in the presence of iodine monochloride. Thus, we found a unique cathode for a sealed primary sodium-halogen cell.

Various mixtures of iodine monochloride and thionyl chloride, phosphoryl chloride or sulfuryl chloride are useful as cathode materials. A preferred composition range is from 1.0 to 99.0 weight percent of iodine monochloride and the remainder of either of the above solvents. We found that 80 weight percent of iodine monochloride and the remainder of either of the above solvents was preferred within the above range.

The anode casing portion can be made of suitable materials, such as, nickel, Kovar alloy, niobium or tantalum, while the cathode casing portion can be made of suitable materials, such as, niobium or tantalum. These metals have been shown to be chemically stable in their respective environments.

One method of hermetically sealing the anode and cathode portions of the casing to opposite sides of the solid electrolyte is described and claimed in co-pending patent application Ser. No. 148,793, filed June 1, 1971, under the title "Method of Forming a Metallic Battery Casing" in the name of Stephan P. Mitoff. This copending application is assigned to the same assignee as the present application.

In the above method, a disc of solid sodium ion-conductive electrolyte, for example, sodium beta-alumina, has stacked thereon a ring of General Electric Company 1013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1000°C for about 1 minute. The resulting seal is helium leak-tight. The process is repeated to seal the cathode portion to the opposite surface of the solid electrolyte. Both anode and cathode portions can also be sealed simultaneously to the disc in the above manner. It will be appreciated that other cell configurations can be employed.

The anode portion is filled with sodium or sodium as an amalgam, or sodium in a nonaqueous electrolyte, through tube 17 after which the tube is sealed, as for example, by welding. The cathode portion is filled with a mixture of iodine monochloride and thionyl chloride, phosphoryl chloride or sulfuryl chloride. The resulting device is a sealed, sodium-halogen cell. Leads (not shown) are attached to the respective casing portions for operation of the cell.

Examples of primary sodium-halogen cells made in accordance with our invention are set forth below:

EXAMPLES 1 and 2

Two vented cells were constructed each of which employed a glass casing consisting of an anode portion and a cathode portion. A platinum wire extended into each casing portion. The portions were separated by a solid sodium beta-alumina electrolyte disc. The anode portion of each cell was then filled with a sodium amalgam of a composition of 90 weight percent of sodium and 10 weight percent of mercury. The cathode portion of cell 1 was filled with a liquid cathode of 80 weight percent iodine monochloride, and 20 weight percent thionyl chloride. The cathode portion of cell 2 was filled with a liquid cathode of 80 weight percent iodine monochloride, and 20 weight percent of phosphoryl chloride. The resulting devices were primary sodium-halogen cells. Respective open circuit voltages of 3.9 and 3.9 volts were obtained.

EXAMPLE 3

The sealed primary sodium-halogen cells 1 and 2 of Examples 1-2 exhibited at 25°C the following initial polarization behavior which is shown below in Table I.

TABLE I

| Cells 1 and 2 | |
|---|---|
| Cell Voltage-Volts | Current Density-ma/cm$^2$ |
| 3.9 | 0 |
| 3.7 | 0.1 |
| 3.5 | 0.2 |
| 3.25 | 0.4 |
| 3.1 | 0.6 |
| 3.05 | 0.7 |
| 3.0 | 0.8 |
| 2.9 | 1.0 |

While other modifications of the invention and variations thereof which may be employed within the scope of the invention have not been described, the invention is intended to include such as may be embraced within the following claims.

What we claim as new and desire to secure by Letters Patent of the United States is:

1. A sealed primary sodium-halogen cell comprising a casing, an anode positioned in the casing, the anode selected from the class consisting of sodium, sodium as an amalgam, and sodium in a nonaqueous electrolyte, a solid sodium beta-alumina ion-conductive electrolyte positioned in the casing adjacent the anode, and a cathode positioned adjacent the opposite side of the electrolyte, the cathode comprising iodine monochloride in a solvent selected from the class consisting of thionyl chloride, phosphoryl chloride, and sulfuryl chloride.

2. A sealed primary sodium-halogen cell as in claim 1, in which the cathode contains from 1.0 to 99.0 weight percent of iodine monochloride.

3. A sealed primary sodium-halogen cell as in claim 1, in which the cathode contains 80 weight percent of iodine monochloride.

* * * * *